(12) United States Patent
Horvath (10) Patent No.: US 9,217,462 B2
(45) Date of Patent: Dec. 22, 2015

(54) TRANSMISSION DEVICE (71) Applicant: T.K.T. Enterprises, Inc., Roselle, IL (US)

(72) Inventor: David Horvath, Medinah, IL (US)

(73) Assignee: T.K.T. ENTERPRISES, INC., Roselle, IL (US)

( * ) Notice: Subject to any disclaimer, the term of this patent is extended or adjusted under 35 U.S.C. 154(b) by 305 days.

(21) Appl. No.: 13/936,970

(22) Filed: Jul. 8, 2013

(65) Prior Publication Data
US 2015/0007694 A1   Jan. 8, 2015

(51) Int. Cl.
*B23P 6/00* (2006.01)
*F16C 3/02* (2006.01)
*F16D 1/02* (2006.01)
*F16H 57/04* (2010.01)
*F16D 1/10* (2006.01)
*F16H 57/00* (2012.01)
*F16H 57/021* (2012.01)
*F16C 35/073* (2006.01)

(52) U.S. Cl.
CPC . *F16C 3/023* (2013.01); *F16D 1/02* (2013.01); *F16D 1/101* (2013.01); *F16H 57/0423* (2013.01); *F16H 57/0471* (2013.01); *F16C 35/073* (2013.01); *F16C 2226/80* (2013.01); *F16D 2001/103* (2013.01); *F16H 2057/0075* (2013.01); *F16H 2057/0216* (2013.01); *Y10T 74/19074* (2015.01); *Y10T 74/19991* (2015.01)

(58) Field of Classification Search
CPC .... F16C 3/023; F16C 2226/80; F16C 35/073; F16D 1/101; F16D 1/02; F16D 2001/103; F16D 2055/0058; F16H 57/0471; F16H 2057/0216; F16H 2057/0075; B60K 17/22; Y10T 74/19074; Y10T 74/19991; B62D 33/0612; B62D 65/00; B62D 65/126; B60P 3/42; B23P 6/00; H05K 3/225; H05K 2201/10598; B25B 27/00
See application file for complete search history.

(56) References Cited

U.S. PATENT DOCUMENTS 8,298,107 B1 * 10/2012 Brookins ................ F16H 3/722
  475/275
2005/0278949 A1 * 12/2005 Miles ........................ B23P 6/00
  29/888.011

* cited by examiner

*Primary Examiner* — David Bryant
*Assistant Examiner* — Lee A Holly
(74) *Attorney, Agent, or Firm* — James B. Conte; Husch Blackwell LLP (57) ABSTRACT

An improved transmission is provided including a splitter shaft having a concentric cavity defined in a distal end thereof and an outer wall surrounding the cavity. The outer wall has an increased thickness in order to reduce failure and fracturing in the outer wall area. A bearing hub adapted for supporting a larger bearing is also provided. The improved transmission may include a system for utilizing existing lubrication lines in order to lubricate a center section of the transmission. The components of the present invention may be provided as part of a kit for retrofitting an existing transmission in order to reduce failures and increase lifespan.

12 Claims, 8 Drawing Sheets

TRANSMISSION DEVICE

CROSS-REFERENCE TO RELATED APPLICATIONS

None.

TECHNICAL FIELD

The present disclosure relates generally to transmissions. More particularly, the present disclosure relates to an improved center section of a transmission which includes components such as a main bearing and splitter shaft. Further, the present invention also relates to an improved system and method for lubricating components in the center section of a transmission.

BACKGROUND OF THE INVENTION

Figure 1:
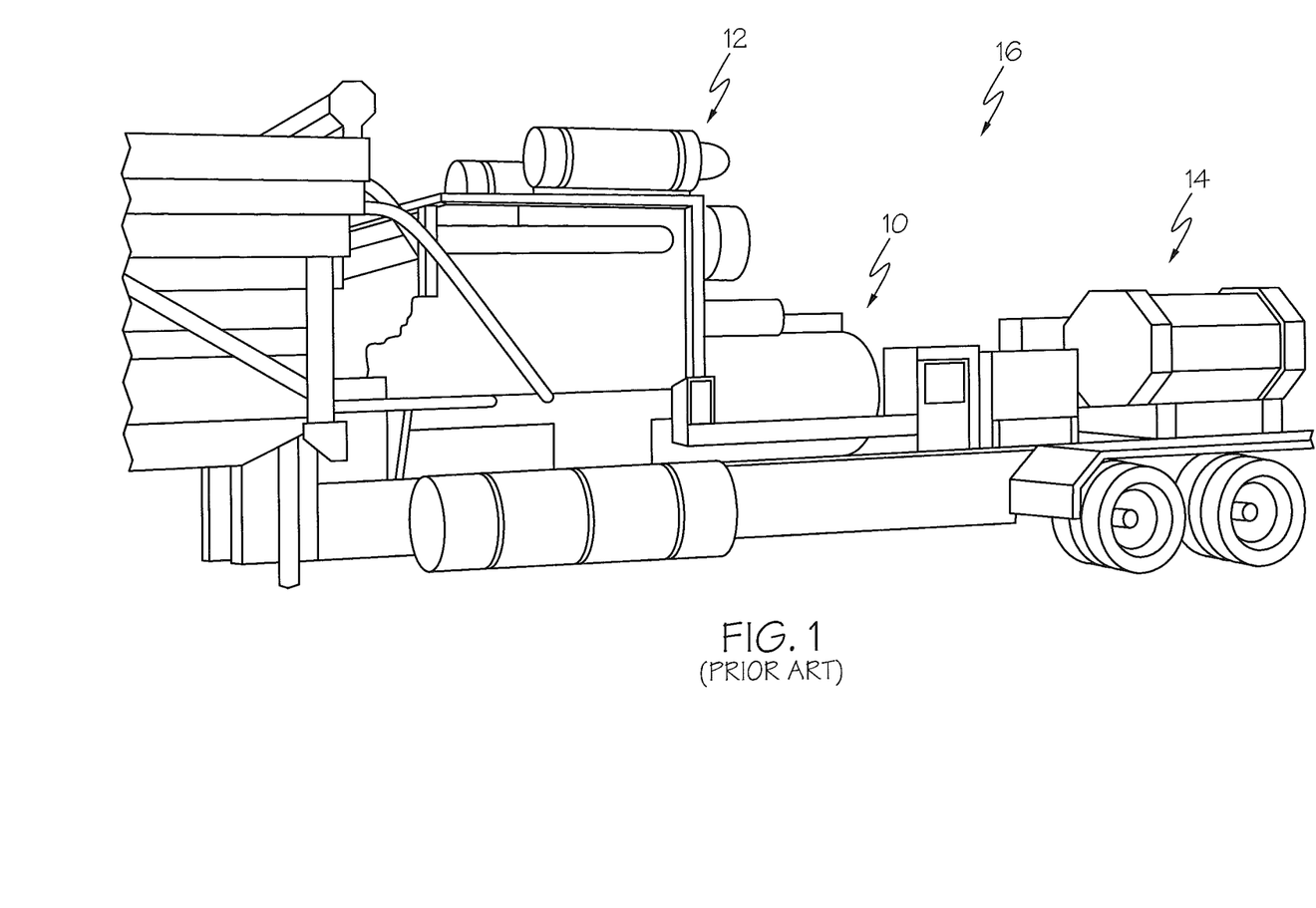
FIG. 1 is a side perspective view of a trailer including an engine, transmission and pump mounted thereon in accordance with the prior art.

Transmissions are well known in the prior art. Transmissions have diverse applications and can be used in areas which include, for example, automobiles, oil-field pumping and fracturing units, off-highway trucks, agricultural tractors, and winch units, such as those on derricks and cranes. As depicted in FIG. 1, a transmission 10 may be used to couple an engine 12 to a pump 14 on a fracking pump unit 16. When used in this capacity, the transmission undergoes significant stress as the pump produces significant power requirements (e.g., 2,000-2,500 HP) and torque loads. Due to such conditions, the transmission 10 may only last around 500 hours in this type of application.

It is known in the prior art that certain components within the transmissions are generally subject to short life failures. For example, components such as the main bearing and splitter shaft generally tend to experience premature failure. It is an object of the present invention to increase the life expectancy of these components by creating new components and remanufacturing existing components to increase their life expectancy over the prior art.

Further, it is also known that transmissions in the prior art use inefficient systems and methods for lubricating the main bearing in the center section of the transmission housing. It is an object of the present invention to directly lubricate the bearings in the center of the transmission through use of a lubrication tube that can spray lubrication directly onto those bearings.

BRIEF SUMMARY OF THE INVENTION

The present invention involves the provision of an improved transmission having an increased lifespan and lower failure rate as compared to previous transmissions. A system and method are provided for retrofitting existing transmissions.

One embodiment of the transmission of the present invention includes a center section comprising an improved splitter shaft, main shaft and bearing located radially therebetween. In one embodiment, the splitter shaft has a concentric cavity defined in a distal end thereof and an outer wall surrounding the cavity. In order to reduce failure, the outer wall has an increased radial thickness, for example, a radial thickness of between about 0.50 inches and 0.75 inches in one embodiment and about 0.65 inches in another embodiment. In one embodiment, the distal end of the splitter shaft has an outer diameter of about 2.6 inches and its cavity has an outer diameter of about 1.3 inches. As such, the ratio of the diameter of the distal end of the splitter shaft to the diameter of its cavity is between about 1.5 and 2.5 in one embodiment and is about 2.0 in another embodiment.

The main shaft includes a concentric pilot member extending axially from a distal end thereof and extending into the cavity of the splitter shaft. A bearing can be located radially between the pilot member of the main shaft and an inner wall of the cavity of the splitter shaft. The pilot member can have an outer diameter of about 0.99 inches. In one embodiment, the ratio of the outer diameter of the pilot member to the diameter of the cavity is between about 0.70 and 0.85 in one embodiment and about 0.78 in another embodiment.

The improved transmission may also include a bearing hub having an axially-extending circular flange adapted for supporting an outer race of a bearing, wherein the flange has an inner diameter of between about 5.0 inches and 6.0 inches in one embodiment and about 5.5 inches in another embodiment. The bearing hub of the present invention is adapted for receiving larger bearings than presently used in prior art designs.

The improved transmission may further include a new tube attached to an existing, non-used lubrication line via a threaded connection and a spray orifice located at a distal end thereof. A method for lubricating a center section of the transmission may comprise the steps of locating an existing lubrication line that runs adjacent the center section of the transmission, inserting a threaded connection into the lubrication line, attaching a new tube onto the threaded connection, running the new tube to a location adjacent components within the center section; and attaching a spray orifice to a terminal end of the tube.

Other and further objects of the invention, together with the features of novelty appurtenant thereto, will appear in the course of the following description.

DESCRIPTION OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One embodiment of the present invention is generally directed to a kit for retrofitting and improving the lifespan of a prior art transmission, such as for example, an Allison S9820 transmission.

Figure 2:
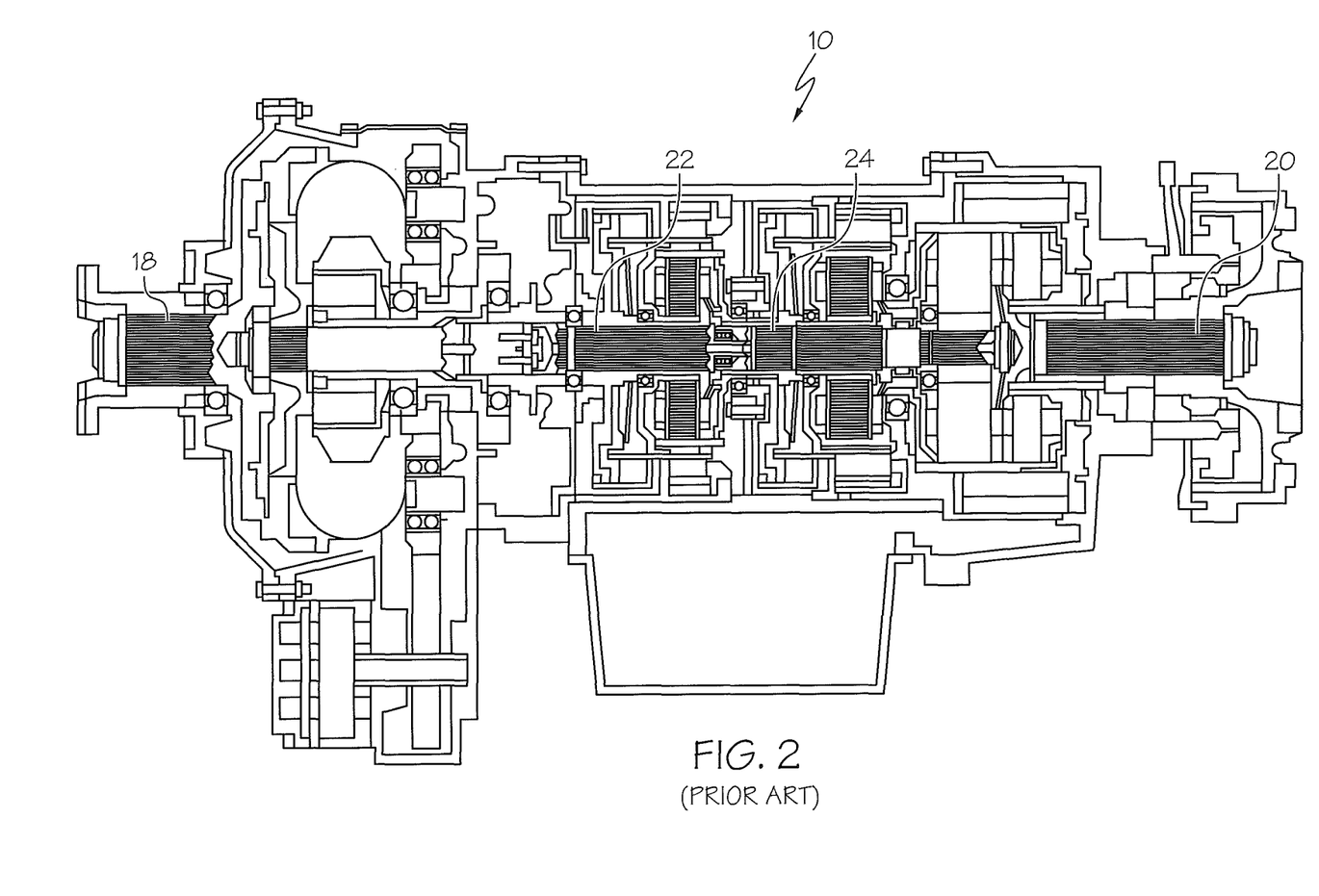
FIG. 2 is a schematic cross-sectional side view of a transmission in accordance with the prior art.

FIG. 2 illustrates a cross-sectional view of a prior art transmission 10 that includes an input shaft 18, which is typically coupled to an engine 12, and an output shaft 20, which is typically coupled with a pump 14. Between the input shaft 18 and output shaft 20 is a center section of the transmission 10 comprising a main shaft 22 and a splitter shaft 24. The center section shown is a planetary section. As shown in greater detail in FIG. 3A, a rear or distal end 26 of the main shaft 22 is rotationally supported by a front or distal end 28 of the splitter shaft 24. As illustrated, the rear end 26 of the main shaft 22 includes a concentric pilot member 30 extending axially therefrom. The end 28 of the splitter shaft 24 includes a concentric opening or cavity 32 defined therein. A pilot bearing 34, inserted into cavity 32, is provided for rotationally supporting the pilot member 30 within the cavity 32.

Figure 3A:
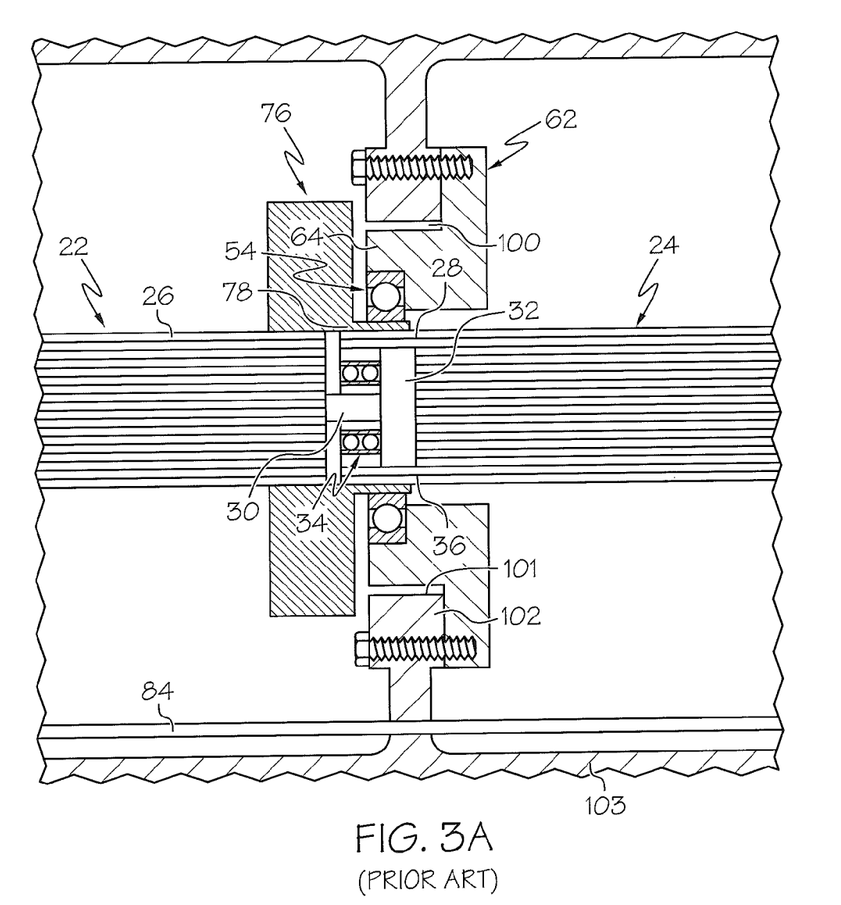
FIG. 3A is an enlarged cross-sectional view of a center section of a transmission in accordance with the prior art.
Figure 4A:
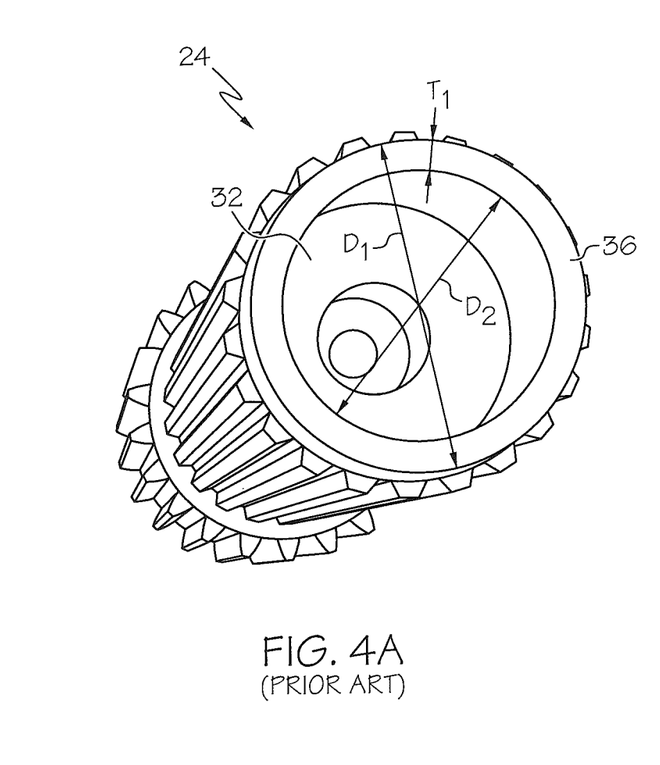
FIG. 4A is a perspective end view of a splitter shaft of a transmission in accordance with the prior art.

In one prior art transmission, for example an Allison S9820 transmission, the outer diameter $D_1$ of the end 28 of the splitter shaft 24 is approximately 2.57 inches, as shown in FIG. 4A. The diameter $D_2$ of the cavity 32 of the same splitter shaft 24 is approximately 2.04 inches, resulting in an outer wall 36 having a thickness $T_1$ of only 0.26 inches. This thin wall 36 of the splitter shaft 24 is a common point of failure in the prior art design shown in FIGS. 3A and 4A. Over time, the thickness $T_1$ of this outer wall 36 was not sufficient to withstand forces acting on the wall 36 and thus would eventually lead to fracture of the splitter shaft 24 in this area. This is especially true when the transmission 10 was used to drive a pump 14 in a fracking operation. Therefore, a need existed for a splitter shaft that would avoid fracture at the outer wall 36 area of the shaft.

Figure 3B:
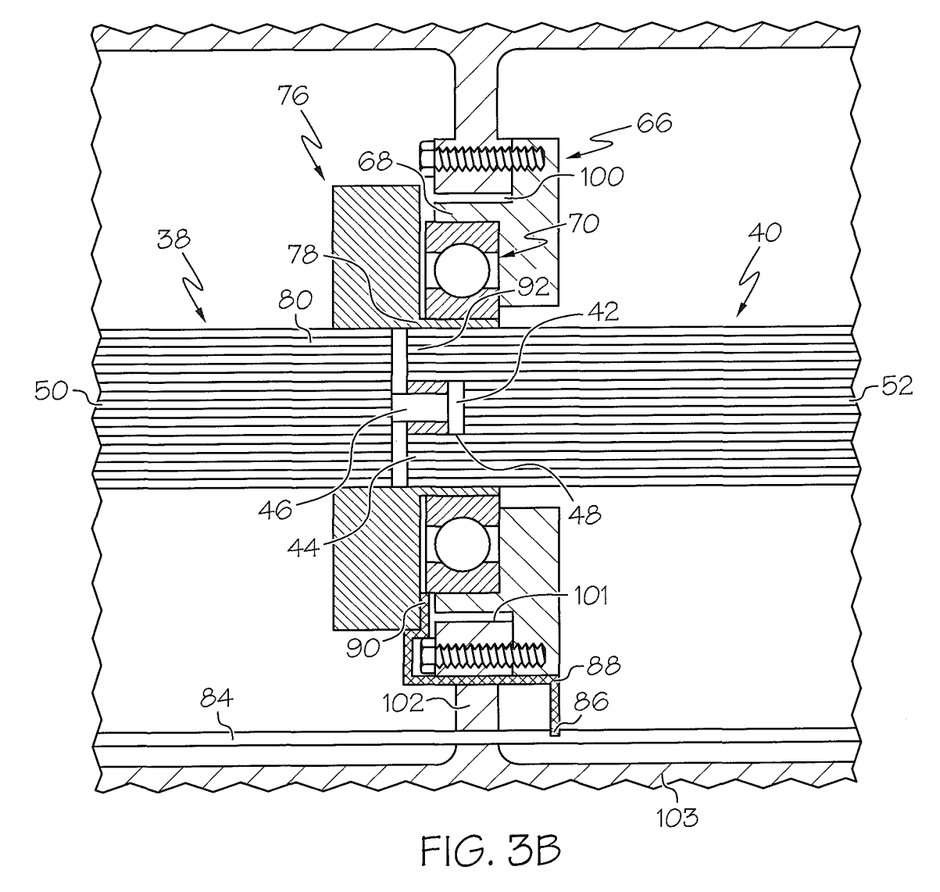
FIG. 3B is an enlarged cross-sectional view of a center section of a transmission in accordance with one embodiment of the present invention.
Figure 4B:
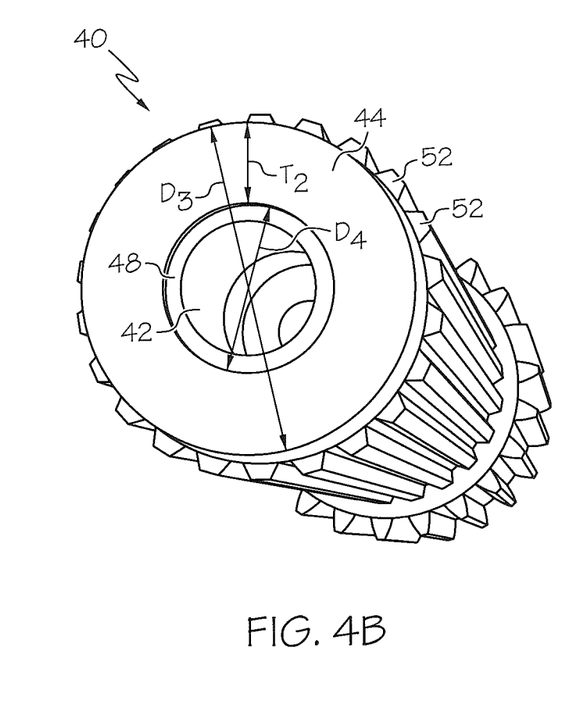
FIG. 4B is a perspective end view of a splitter shaft of a transmission in accordance with one embodiment of the present invention.

An improved main shaft 38 and splitter shaft 40 are shown in FIG. 3B. As illustrated in FIGS. 4A and 4B, the outer diameter $D_3$ of the splitter shaft 40 may remain the same as the outer diameter $D_1$ of the prior art splitter shaft 24 so that the new splitter shaft 40 may be retrofitted into an existing transmission, such as an Allison S9820 transmission. However, the diameter $D_4$ of the concentric cavity 42 of the new splitter shaft 40 is substantially smaller, thereby resulting in a thicker outer wall 44. In one embodiment, the outer diameter $D_3$ is approximately between about 2.25 inches and 2.75 inches (e.g., 2.57 inches) and the diameter $D_4$ of the cavity 42 is approximately between about 1.0 inch and 1.5 inches (e.g., 1.27 inches), resulting in an outer wall 44 having a thickness $T_2$ of between about 0.50 inches and 0.75 inches (e.g., 0.65 inches). In other words, the thickness $T_2$ of the outer wall 44 (e.g., 0.65 inches) in the improved design is between about two and three times greater than the thickness $T_1$ of the outer wall 36 (e.g., 0.26 inches) in the prior art design. It will be appreciated that this increased thickness results in the improved splitter shaft 40 having fewer failures and a substantially longer life as compared to the previous splitter shaft 24. The ratio of the outer diameter $D_3$ of the distal end 92 of the splitter shaft 40 to the diameter $D_4$ of its cavity 42 is between about 1.5 and 2.5 in one embodiment and is about 2.0 in another embodiment. It will be further appreciated that the dimensions of the splitter shaft 40 provided herein are simply examples and other suitable dimensions may be employed in various embodiments.

As illustrated in FIG. 3B, because the diameter $D_4$ of the cavity 42 of the improved splitter shaft 40 is smaller than the diameter $D_2$ of the cavity 32 of the prior art splitter shaft 24, the area and volume for receiving the pilot member 46 and pilot bearing 48 are smaller. In the prior art, the pilot bearing 34 is a ball bearing, whereas in the improved design, the pilot bearing 48 can be a needle bearing, brass bushing or other similar low profile bearing or bushing in order to compensate for the smaller diameter $D_4$ of cavity 42. In such an embodiment, it will be appreciated that the prior art main shaft 22 need not be exchanged. Instead, the original pilot ball bearing 34 may simply be replaced with a new pilot bushing or bearing 48 having a smaller outer diameter as compared to the diameter of the original pilot ball bearing 34. However, in some embodiments, the original main shaft 22 may optionally be replaced with a new main shaft 38 having a concentric pilot member 46 with a smaller outer diameter as compared to the diameter of the pilot member 30 of the original main shaft 22. The outer diameter of the pilot member 46 may be between about 0.75 inches and 1.25 inch and, in one embodiment is about 0.99 inches. As such, the ratio of the outer diameter of the pilot member 46 to the diameter $D_4$ of the cavity 42 can be between about 0.5 and 1.0 in one embodiment, between about 0.70 and 0.85 in another embodiment and about 0.78 in a further embodiment.

The main shaft 38 and splitter shaft 40 can be formed of any suitable metallic material and, in one embodiment, can be formed of AISI 1043 steel or AISI 4320 steel. As illustrated in FIG. 3B, like with the prior art, the main shaft 38 and splitter shaft 40 are splined and include longitudinally-extending splines or teeth 50 and 52, respectively, protruding radially from the exterior surfaces thereof.

Figure 5A:
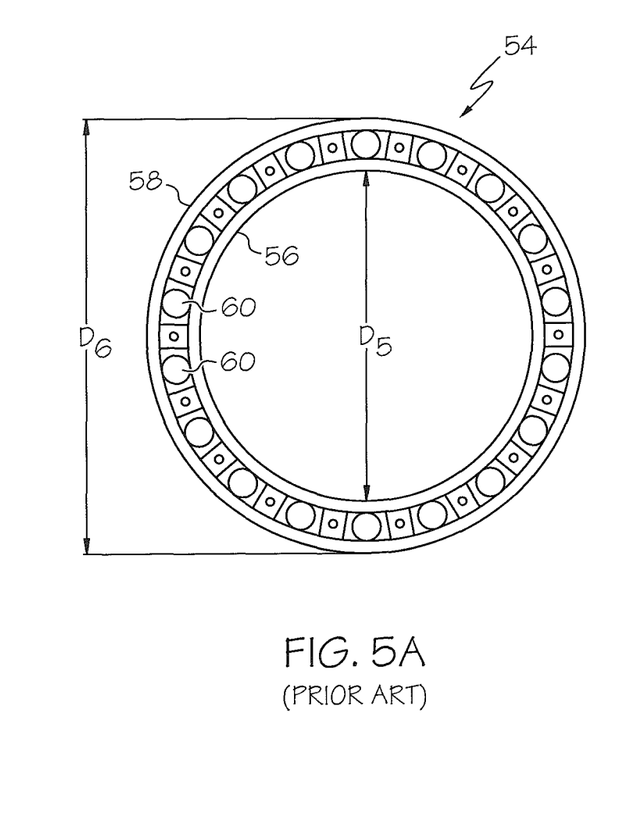
FIG. 5A is a side view of a main bearing of a transmission in accordance with the prior art.

Another cause of failure within prior art transmissions was due to the main bearing 54, which is located generally around the splitter shaft 24. FIGS. 3A depicts a prior art main bearing 54 located around the circular hub 78 of a splitter ring gear 76 positioned at the front end 28 of the splitter shaft 24. The hub 78 of the splitter ring gear 76 includes internal splines or teeth which mate with the external splines or teeth of the splitter shaft 24. As shown in FIG. 5A, the prior art main bearing 54 includes an inner race 56, an outer race 58 and roller balls 60 located there between, as is well known. The inner race 56 has an inner diameter $D_5$ enabling the bearing 54 to be placed around the hub 78 of a splitter ring gear 76, as illustrated in FIG. 3A. Further, the outer race 58 has an outer diameter $D_6$ enabling the bearing 54 to be placed within a circular flange 64 of a static bearing hub 62 having an inner diameter $D_9$, which can be about 5.51 in one embodiment. In one prior art transmission, for example an Allison S9820 transmission, the inner diameter $D_5$ of the inner race 56 is about 3.74 inches and the outer diameter $D_6$ of the outer race 58 is about 5.11 inches.

Figure 5B:
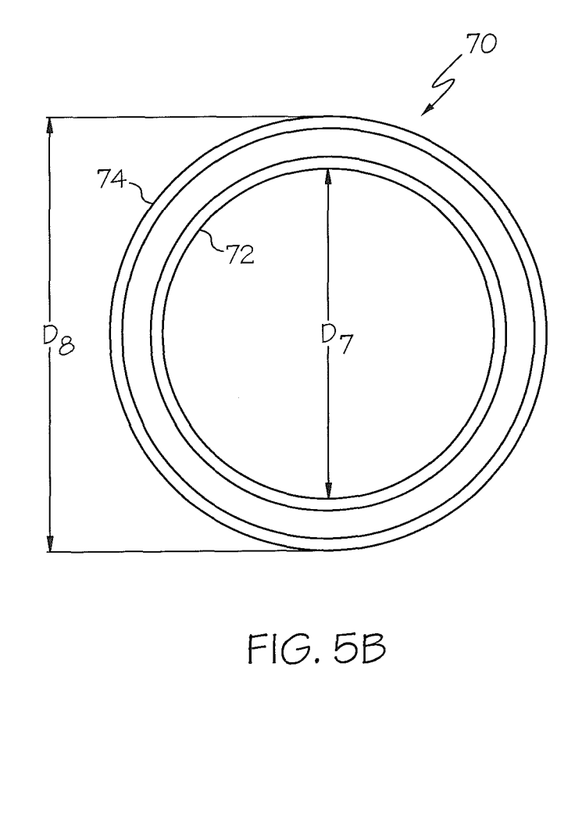
FIG. 5B is a side view of a main bearing of a transmission in accordance with one embodiment of the present invention.
Figure 6A:
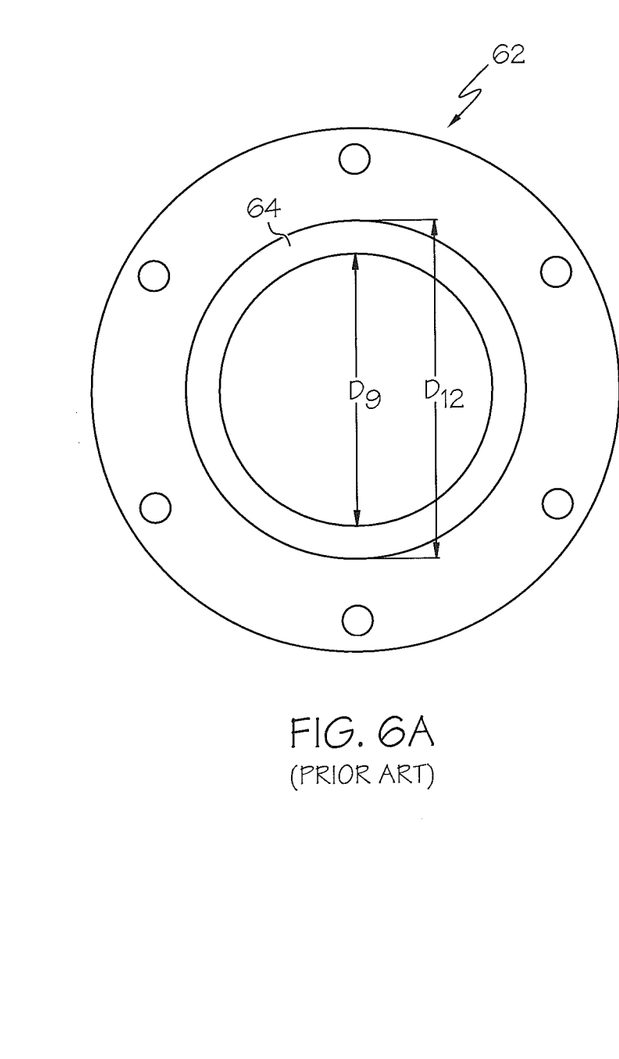
FIG. 6A is a side view of a main bearing hub of a transmission in accordance with the prior art.
Figure 6B:
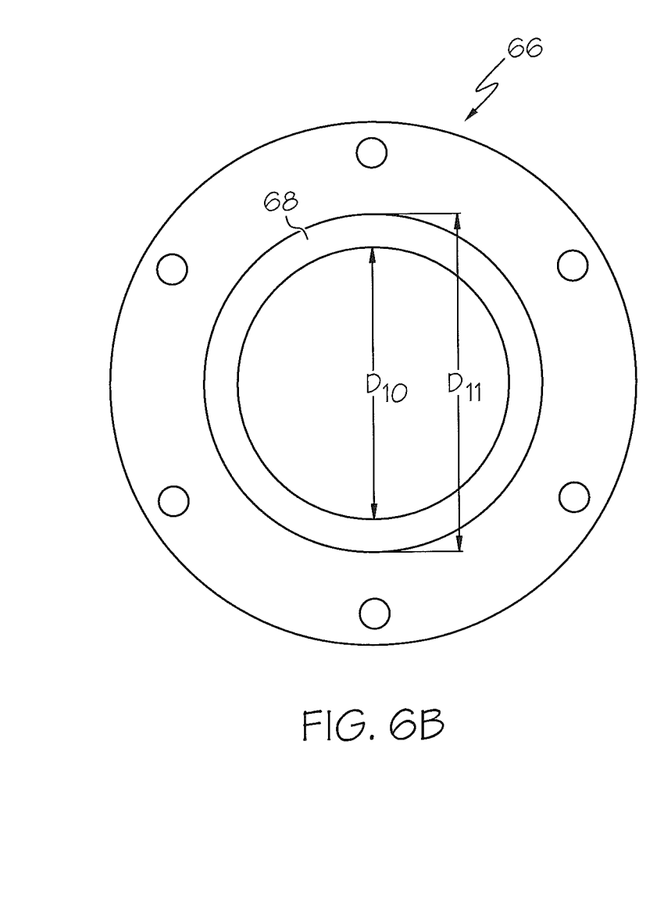
FIG. 6B is a side view of a main bearing hub of a transmission in accordance with one embodiment of the present invention.

An improved main bearing hub 66 is provided in the present invention in order to accommodate a larger main bearing 70. The new bearing hub 66 has a flange 68 with a larger inner diameter $D_{10}$ in order to accommodate a main bearing 70 having an outer race 74 with a larger outer diameter $D_8$ as compared to the outer diameter $D_6$ of the previous main bearing 54.

In one embodiment, the inner diameter $D_{10}$ of flange 68 is about 5.5 inches. The flange 64 of a prior art bearing hub 62 can be machined to decrease the thickness of the flange 64 in order to accommodate a larger main bearing 70. In this way, a new bearing hub 66 can be remanufactured from an existing prior art bearing hub 62. In another embodiment, a new hub assembly 66 can be created anew in order to meet the larger dimensional requirements of the larger bearing 70 of the present invention. In this case the flange 68 of hub 66 could have a larger outer diameter D11 than the outer diameter D12 of flange 64 of hub 62. To accommodate the increase in outer diameter D11, the diameter of an existing orifice 100 in a dividing wall 102 of the existing transmission housing 103 would have to be increased to accommodate the increased diameter D11. This could be accomplished by machining the inner sidewall 101 delimiting the orifice 100.

The inner race 72 of the new bearing 70 can have an inner diameter $D_7$ that is equal to the inner diameter $D_5$ of the inner race 56 of the previous main bearing 54. Alternatively, the inner race 72 of the new bearing 70 can have an inner diameter $D_7$ that is suitable for placement around a hub 78 that is larger or smaller than the hub 78 of the previous splitter ring gear 76. In one improved embodiment, the inner diameter $D_7$ of the inner race 72 is about 3.93 inches and the outer diameter $D_8$ of the outer race 74 is about 5.51 inches. The splitter ring gear 76 may be replaced or modified in order to include a hub 78 that is appropriately sized relative to the inner diameter $D_7$ of the inner race 72 of the new main bearing 70. For instance a sleeve can be fitted around the hub 78. It will be appreciated that the dimensions of the new bearing 70 provided herein are simply examples and other suitable dimensions may be employed in various embodiments. Both the radial thickness and the axial thickness of the new main bearing 70 may be increased relative to the original bearing 54. It will further be appreciated that the new main bearing 70 may be press fit onto the hub 78 of the splitter ring gear 76 and press fit into the flange 64 of the bearing hub 62.

The prior art transmission 10 also includes a lubrication line 84 which was originally used to provide lubrication for a speedometer gear within the transmission housing of the prior art transmission. The lubrication line 84 carried lubrication, such as oil, from an oil cooler to the speedometer gear. However, the speedometer gear is typically no longer used in most transmissions and the lubrication line 84 remains unused. As illustrated in FIG. 3A, the lubrication line 84 runs past the center section of the transmission 10.

Figure 7:
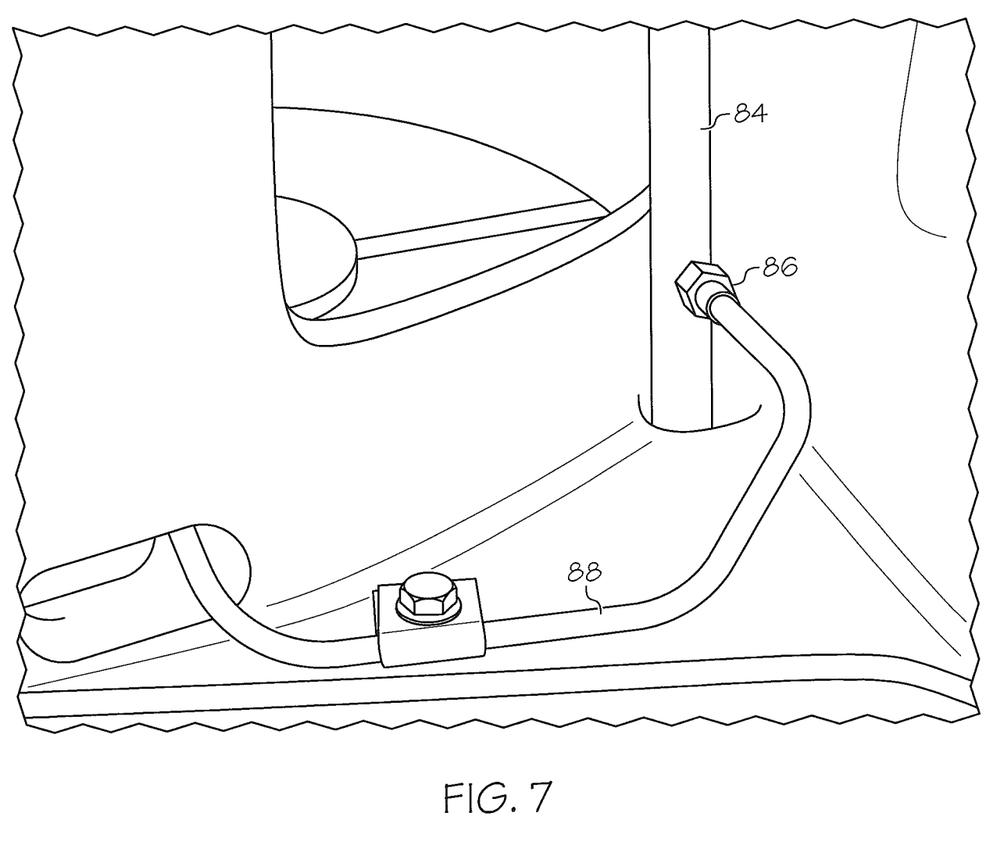
FIG. 7 is a side perspective view of a lubrication line in accordance with one embodiment of the present invention.

In one embodiment of the present invention, the lubrication line 84 is repurposed for directing lubrication to the components in the center section of the transmission such as the main bearing hub 66, main bearing 70, splitter ring gear 76 and splitter shaft 40, for example. In order to repurpose the existing lubrication tube 84, a person of ordinary skill in the art only needs to add a threaded connection or tap 86 onto the existing tube 84. From this threaded connection 86, the user can then connect a new tube 88 and run this new tube 88 to a desired location adjacent the center section, as demonstrated in FIGS. 3B and 7. The new tube 88 can include a terminal end having one or more spray orifices 90 to deliver the lubrication to the directed components. A shutoff valve (not shown) can optionally be added downstream of the newly added threaded connection 86 to divert all the lubrication to the center section components.

A method for lubricating a center section of the transmission 10 may comprise the steps of locating an existing lubrication line 84 that runs adjacent the center section of the transmission 10, inserting a threaded connection 86 into the lubrication line 84, attaching a new tube 88 onto the threaded connection 86, running the new tube 88 to a location adjacent components within the center section, and attaching a spray orifice 90 to a terminal end of the tube 88.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for retrofitting a transmission, said method comprising the steps of:
    replacing an existing splitter shaft with a retrofit splitter shaft having a wall thickness that is greater than a wall thickness of said existing splitter shaft;
    replacing an existing main bearing with a retrofit main bearing having an outside diameter that is greater than an outside diameter of said existing main bearing; and
    replacing an existing main bearing hub with a retrofit main bearing hub having a flange with an inner diameter that is greater than an inner diameter of a flange of said existing main bearing hub.

2. The method of claim 1 further comprising the step of machining an existing orifice of a dividing wall of a housing of said transmission in order to accommodate said flange of said retrofit main bearing hub.

3. The method of claim 1 further comprising the step of placing a sleeve around a hub of a splitter ring gear in order to accommodate an inner diameter of said retrofit main bearing that is larger than an inner diameter of said existing main bearing.

4. The method of claim 1 further comprising the step of machining a hub of a splitter ring gear in order to accommodate an inner diameter of said retrofit main bearing that is smaller than an inner diameter of said existing main bearing.

5. The method of claim 1 wherein said retrofit splitter shaft has a cavity defined in a distal end of said retrofit splitter shaft, said cavity has a diameter, said wall having said thickness greater than said wall thickness of said existing splitter shaft being an outer wall, said outer wall extending around said cavity, said retrofit splitter shaft at said distal end has an outer diameter.

6. The method of claim 5 wherein said outer wall has a radial thickness of from about 0.5 inches to about 0.75 inches.

7. The method of claim 5 wherein a ratio of said retrofit splitter shaft outer diameter to said cavity diameter is from 1.5 to 2.5.

8. The method of claim 5 wherein said retrofit splitter shaft outer diameter is from 2.25 to 2.75 inches and said cavity diameter is from 1.0 to 1.5 inches.

9. The method of claim 5 wherein said transmission prior to retrofit has a main shaft with a pilot member, said method further comprising inserting said pilot member into said cavity.

10. The method of claim 9 wherein said ratio of an outer diameter of said pilot member to said cavity diameter is from 0.7 to 0.85.

11. The method of claim 1 wherein said inner diameter of said flange of said retrofit main bearing hub is about 5.5 inches and said inner diameter of said flange of said existing bearing hub is 5.1 inches.

12. The method of claim 1 further comprising:
locating an existing lubrication line that runs adjacent a center section of said transmission;
inserting a threaded connection into said lubrication line;
attaching a tube onto said threaded connection;
running said tube to a location adjacent components within said center section; and
attaching a spray orifice to a terminal end of said tube.

* * * * *